(12) United States Patent
Kawakami et al.

(10) Patent No.: US 11,052,355 B2
(45) Date of Patent: Jul. 6, 2021

(54) GAS SEPARATION MEMBRANE CONTAINING HETEROMORPHOUS SHAPED SILICA NANOPARTICLES

(71) Applicants: NISSAN CHEMICAL CORPORATION, Tokyo (JP); TOKYO METROPOLITAN UNIVERSITY, Tokyo (JP)

(72) Inventors: Hiroyoshi Kawakami, Hachioji (JP); Manabu Tanaka, Hachioji (JP); Yuri Kameyama, Hachioji (JP); Yuki Kudo, Hachioji (JP); Hiroto Mikami, Hachioji (JP); Tadayuki Isaji, Funabashi (JP); Kazutoshi Odaka, Funabashi (JP); Takamasa Kikuchi, Funabashi (JP)

(73) Assignees: NISSAN CHEMICAL CORPORATION, Tokyo (JP); TOKYO METROPOLITAN UNIVERSITY, Tokyo (JP)

( * ) Notice: Subject to any disclaimer, the term of this patent is extended or adjusted under 35 U.S.C. 154(b) by 196 days.

(21) Appl. No.: 16/327,663

(22) PCT Filed: Aug. 21, 2017

(86) PCT No.: PCT/JP2017/029713
§ 371 (c)(1),
(2) Date: Feb. 22, 2019

(87) PCT Pub. No.: WO2018/038027
PCT Pub. Date: Mar. 1, 2018

(65) Prior Publication Data
US 2019/0184345 A1    Jun. 20, 2019

(30) Foreign Application Priority Data
Aug. 23, 2016 (JP) .............................. JP2016-163081

(51) Int. Cl.
| | | |
|---|---|---|
| *B01D 71/78* | (2006.01) | |
| *B01D 71/64* | (2006.01) | |
| *B01D 71/70* | (2006.01) | |
| *B01D 71/68* | (2006.01) | |
| *C01B 33/146* | (2006.01) | |
| *B01D 71/26* | (2006.01) | |
| *B01D 71/52* | (2006.01) | |
| *B01D 71/44* | (2006.01) | |
| *B01D 71/24* | (2006.01) | |
| *B01D 53/22* | (2006.01) | |
| *B01D 69/14* | (2006.01) | |
| *B01D 71/82* | (2006.01) | |
| *B82Y 30/00* | (2011.01) | |

(52) U.S. Cl.
CPC ............ *B01D 71/78* (2013.01); *B01D 53/228* (2013.01); *B01D 69/148* (2013.01); *B01D 71/24* (2013.01); *B01D 71/26* (2013.01); *B01D 71/44* (2013.01); *B01D 71/52* (2013.01); *B01D 71/64* (2013.01); *B01D 71/68* (2013.01); *B01D 71/70* (2013.01); *B01D 71/82* (2013.01); *C01B 33/146* (2013.01); *B01D 2323/08* (2013.01); *B01D 2323/36* (2013.01); *B01D 2323/38* (2013.01); *B01D 2323/40* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 2009/0126567 A1* | 5/2009 | Liu ...................... | B01D 69/148 95/45 |
| 2013/0146530 A1* | 6/2013 | Wang .................. | B01D 69/148 210/500.38 |
| 2016/0263533 A1* | 9/2016 | Odeh ................... | B01D 69/148 |

FOREIGN PATENT DOCUMENTS

| | | | |
|---|---|---|---|
| JP | 2007-99607 A | 4/2007 | |
| JP | 2010-222228 | * 10/2010 | ............. B01D 53/22 |
| JP | 2010-222228 A | 10/2010 | |
| JP | 2012-101953 A | 5/2012 | |
| JP | 2012-224777 A | 11/2012 | |
| JP | 2013-014489 A | 1/2013 | |
| JP | 2015-115132 A | 6/2015 | |
| JP | 2015-136669 A | 7/2015 | |
| KR | 2014-0132976 A | 11/2014 | |

OTHER PUBLICATIONS

English language machine translation for JP 2010-222228. Retrieved from translationportal.epo.org and Oct. 29, 2020. (Year: 2020).*
Aug. 2, 2019 Search Report issued in European Patent Application No. 17843507.9.
Takahashi et al., "Gas permeation in poly(ether imide) nanocomposite membranes based on surface-treated silica. Part 2: With chemical coupling to matrix", Polymer, vol. 47, 2006, pp. 7535-7547.
Oct. 10, 2017 International Search Report issued in International Patent Application No. PCT/JP2017/029713.

* cited by examiner

*Primary Examiner* — Jason M Greene
(74) *Attorney, Agent, or Firm* — Oliff PLC

(57) ABSTRACT

A gas separation membrane containing a matrix resin and hyperbranched polymer- or dendrimer-bound, heteromorphous shaped silica nanoparticles, which are formed of heteromorphous shaped silica nanoparticles having surfaces onto which a hyperbranched polymer or a dendrimer is chemically added.

15 Claims, No Drawings

GAS SEPARATION MEMBRANE CONTAINING HETEROMORPHOUS SHAPED SILICA NANOPARTICLES

TECHNICAL FIELD

The present invention relates to a method for producing a gas separation membrane containing hyperbranched polymer- or dendrimer-bound, heteromorphous shaped silica nanoparticles; i.e., heteromorphous shaped silica nanoparticles onto which a hyperbranched polymer or a dendrimer is chemically added.

BACKGROUND ART

In recent years, studies on fine particles (nanoparticles) having a particle size on the order of nanometers (i.e., a mean particle size of about 1 nm to several hundreds of nanometers) have been actively conducted as part of nanotechnology research. Unlike the case of a conventional bulk material, nanoparticles (i.e., nanosized material) are known to exhibit and impart various functions and characteristics, and thus are expected to have applications in a wide range of industrial fields. Although nanoparticles can be produced in the form of primary particles, they have strong aggregation property attributed to their fineness and, when left to stand, form aggregates having a particle size on the order of micrometers. For example, in the case where inorganic nanoparticles as described above are added to an organic component, thermal resistance and mechanical strength will be improved, but the inorganic nanoparticles, which have strong aggregation property, may form aggregates on the order of micrometers in an organic solvent or a polymer matrix. Consequently, the resultant organic-inorganic composite material may fail to exhibit expected properties and performance. Thus, uniform chemical modification of the surfaces of nanoparticles has been proposed for maintaining their primary particle dispersibility (see, for example, Patent Document 1).

Furthermore, attention has been paid to an organic-inorganic composite material that is prepared by mixing of an inorganic component and an organic component at a nanometric or molecular level and can synergistically increase the advantages of both the components. This concept has been applied to polymer gas separation membranes whose utility has received attention for solving energy and environmental problems. Thus, demand has arisen for preparation of an organic-inorganic composite material through addition of inorganic nanoparticles to a polymer matrix to achieve high mechanical strength, thermal stability, and gas permeability, which cannot be attained by conventional techniques.

A gas separation method employing the gas permeability of a polymer membrane can achieve gas separation and recovery without causing a phase change of gas. The gas separation method involves a simpler operation than another gas separation technique, can use a small-sized apparatus, and enables continuous gas separation. Thus, the gas separation method is advantageous in terms of low environmental load. Such an energy-saving method using a polymer gas separation membrane has recently received particular attention as a technique for separation and recovery of greenhouse gases, preparation of oxygen-enriched air, or purification of natural gas. Although such a method is expected to be used in practice, the method needs further improvements in gas separation performance and gas permeability.

As described above, attempts have been made to improve the gas permeability of a polymer membrane by incorporation of inorganic nanoparticles into the membrane. The aforementioned aggregation of nanoparticles also causes problems in preparation of an organic-inorganic composite gas separation membrane. Specifically, an existing organic-inorganic composite gas separation membrane exhibits low membrane strength and fails to achieve high particle content, which are caused by aggregation of inorganic nanoparticles in a polymer matrix. Thus, such a gas separation membrane has a problem in that an increase in gas permeability is at most a factor of several times.

For example, there has been reported a method for improving the gas separation membrane performance of a polymer membrane by incorporation of inorganic nanoparticles into the membrane, the method involving treatment of the surfaces of silica nanoparticles with an amino group-containing silane coupling agent, treatment of the surface-silylated particles with a polymer to thereby prepare polymer-grafted silica particles, and dispersion of the polymer-grafted silica particles into a polymer, to thereby form a resin membrane. The resin membrane was examined for its performance as a gas separation membrane (see Non-Patent Document 1). The results of the examination demonstrate that the membrane exhibits, for example, unsatisfactory gas permeability.

In order to solve such a problem, there has been proposed a gas separation membrane exhibiting considerably improved gas permeability and containing inorganic nanoparticles that do not aggregate in an organic solvent or a polymer matrix and exhibit excellent uniform dispersibility, wherein the nanoparticles are prepared by bonding of the surfaces of silica nanoparticles to a bulky hyperbranched polymer or dendrimer (see Patent Document 2).

PRIOR ART DOCUMENTS

Patent Documents

Patent Document 1: Japanese Patent Application Laid-Open (kokai) No. 2007-99607
Patent Document 2: Japanese Patent Application Laid-Open (kokai) No. 2010-222228

Non-Patent Document

Non-Patent Document 1: Polymer, 47 (2006), pp. 7535-7547

SUMMARY OF THE INVENTION

Problems to be Solved by the Invention

The present inventors have examined the technique disclosed in Patent Document 2 for the development of a method for improving the performance of a gas separation membrane through incorporation of inorganic nanoparticles into a polymer membrane. The inventors have found that spherical inorganic nanoparticles employed in the above method disadvantageously result in low inter-particle contact occurrence and insufficient gas permeability.

An object of the present invention is to provide a gas separation membrane which contains surface-modified, heteromorphous shaped silica nanoparticles therein and which exhibits remarkably high gas permeability.

The present inventors have conducted extensive studies for solving the aforementioned problems, and have found that a gas separation membrane having considerably improved gas permeability can be produced by use of, as silica nanoparticles, heteromorphous shaped silica nanoparticles such as rod-like shape silica nanoparticles, string-of-pearls shape silica nanoparticles, and confeito-like (or rock candy-like) shape silica nanoparticles. The present invention has been accomplished on the basis of this finding.

Means for Solving the Problems

Means for Solving the Problems

Accordingly, the present invention is directed to a gas separation membrane as described in any one of the following first to eighth aspects.

A first aspect of the invention is directed to a gas separation membrane, characterized by comprising a matrix resin and hyperbranched polymer- or dendrimer-bound, heteromorphous shaped silica nanoparticles, which are formed of heteromorphous shaped silica nanoparticles having surfaces onto which a hyperbranched polymer or a dendrimer is chemically added.

A second aspect is a specific embodiment of the gas separation membrane of the first aspect, wherein the heteromorphous shaped silica nanoparticles are at least one silica nanoparticle species selected from the group consisting of:

rod-like shape silica nanoparticles, which have a ratio D1/D2 of ≥4, wherein D1 is a particle size determined through a dynamic light scattering method, and D2 is a particle size determined through a nitrogen gas adsorption method; which has a D1 of 40 to 500 nm; and which have a uniform diameter of 5 to 40 nm as observed under a transmission electron microscope;

string-of-pearls shape silica nanoparticles which are formed of colloidal silica spherical particles having a particle size D2 determined through the nitrogen gas adsorption method of 10 to 80 nm, and silica which binds together the colloidal silica spherical particles; which has a ratio D1/D2 of ≥3, wherein D1 is a particle size determined through the dynamic light scattering method, and D2 is a particle size of the colloidal silica spherical particles determined through the nitrogen gas adsorption method; which has a D1 of 40 to 500 nm; and which are formed of the colloidal silica spherical particles connected together; and confeito-like shape silica nanoparticles which have a surface roughness S2/S3 of 1.2 to 10, wherein S2 is a specific surface area determined through the nitrogen gas adsorption method, and S3 is a specific surface area obtained by reducing a mean particle size D3 determined through image analysis; which have a D3 of 10 to 60 nm; and which have a plurality of wart-shaped projections on the surfaces thereof.

A third aspect is a specific embodiment of the gas separation membrane of the first or second aspect, wherein the hyperbranched polymer- or dendrimer-bound, heteromorphous shaped silica nanoparticles are formed of heteromorphous shaped silica nanoparticles bound to a hyperbranched polymer or a dendrimer by the mediation of a reactive functional group-containing compound.

A fourth aspect is a specific embodiment of the gas separation membrane of any one of the first to third aspects, wherein the reactive functional group-containing compound is a functional group-containing silane coupling agent.

A fifth aspect is a specific embodiment of the gas separation membrane of any one of the first to fourth aspects, wherein the reactive functional group-containing compound is a compound represented by the following formula (1):

[F1]

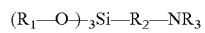

$(R_1-O)_3Si-R_2-NR_3$           (1)

(wherein $R_1$ represents a methyl group or an ethyl group; $R_2$ represents a C1 to C5 alkylene group, an amido group, or an aminoalkylene group; and $R_3$ represents hydrogen or a group represented by the following formula (2):

[F2]

$-OC-R_4-COOH$           (2)

(wherein $R_4$ represents a C1 to C20 alkylene group or a C6 to C18 aromatic group).

A sixth aspect is a specific embodiment of the gas separation membrane of any one of the first to fifth aspects, wherein the hyperbranched polymer or dendrimer is a condensate of a monomer having a structure represented by the following formula (3):

[F3]

$X_m-R_5-Y_n$           (3)

(wherein $R_5$ represents a C1 to C20 alkylene group or a C6 to C18 aromatic group; each of X and Y represents a carboxyl group, an amino group, a methyl group, or a halogen atom; and m and n are integers of 1 to 4, with 3≤m+n≤6).

A seventh aspect is a specific embodiment of the gas separation membrane of any one of the first to sixth aspects, wherein the matrix resin is at least one species selected from the group consisting of polyimide, polysulfone, polyether, polydimethylsiloxane, poly(substituted acetlyene), poly-4-methylpentene, and natural rubber.

An eighth aspect is a specific embodiment of the gas separation membrane of any one of the first to seventh aspects, wherein the hyperbranched polymer- or dendrimer-bound, heteromorphous shaped silica nanoparticle content is 1 to 70 mass %.

Effects of the Invention

In the gas separation membrane of the present invention, hyperbranched polymer- or dendrimer-bound, heteromorphous shaped silica nanoparticles are uniformly dispersed in resin. In addition, occurrence of contact between particles is improved, whereby a gas separation membrane exhibiting remarkably high gas permeation can be formed.

MODES FOR CARRYING OUT THE INVENTION

The present invention will next be described in detail. The heteromorphous shaped silica nanoparticles employed in the present invention have a non-spherical shape and have a particle size determined through the dynamic light scattering method of ≤500 nm.

The heteromorphous shaped silica nanoparticles employed in the present invention are preferably at least one silica nanoparticle species selected from the group consisting of rod-like shape silica nanoparticles, string-of-pearls shape silica nanoparticles, and confeito-like shape silica nanoparticles, for enhancing the chance of contact between silica nanoparticles in matrix resin. These silica nanoparticle species may be used in combination.

When the heteromorphous shaped silica nanoparticles have an rod-like shape, preferably, the ratio D 1/D2 is ≥4, wherein D1 is a particle size (nm) determined through a dynamic light scattering method, and D2 is a particle size (nm) determined through a nitrogen gas adsorption method.

D1 is 40 to 500 nm, and each nanoparticle has a uniform diameter of 5 to 40 nm as observed under a transmission electron microscope.

When the heteromorphous shaped silica nanoparticles have a string-of-pearls shape comprising colloidal silica spherical particles and silica which binds together the colloidal silica spherical particles, and which are formed of the colloidal silica spherical particles connected together, preferably, the ratio D1/D2 is ≥3, wherein D1 is a particle size determined through the dynamic light scattering method, and D2 is a particle size of the colloidal silica spherical particles determined through the nitrogen gas adsorption method, and D1 is 40 to 500 nm.

When the heteromorphous shaped silica nanoparticles have a confeito-like shape in which a plurality of wart-shaped projections are present on the surfaces thereof, preferably, the surface roughness S2/S3 is 1.2 to 10, wherein S2 ($m^2/g$) is a specific surface area determined through the nitrogen gas adsorption method, S3 ($m^2/g$) is a specific surface area obtained by reducing a mean particle size D3 (nm) determined through image analysis, and D3 is 10 to 60 nm.

The particle size D1 may be determined through the dynamic light scattering method by means of, for example, Zetasizer Nano ZS (product of Malvern Instruments). The particle size D2 may be determined through the nitrogen gas adsorption method by means of, for example, Monosorb™ (product of Quantachrome). D2 can be derived from the specific surface area S2 ($m^2/g$) determined through the nitrogen gas adsorption method by the following calculation formula:

$$D2 \text{ (nm)}=2720/S2 \text{ }(m^2/g) \quad \text{Formula (a):}$$

The specific surface area S3 obtained by reducing a mean particle size D3 determined through image analysis is obtained through the following procedure. Specifically, a sample containing silica nanoparticles is observed under a transmission electron microscope, to thereby take a projection photoimage, and 50 particles in the image are selected at random. The largest diameter DL of each particle is measured, and the average value is employed as the mean particle size D3. Then, assuming that the silica nanoparticles of the sample are complete spherical particles, the specific surface area S3 is calculated by the conversion formula (b):

$$S3 \text{ }(m^2/g)=2720/D3 \text{ (nm).} \quad \text{(b):}$$

Image analysis may be performed by means of, for example, an automated image analyzer LUZEX$^P$ AP (product of Nireco).

Specific surface area is a surface area per unit mass. Thus, in the case of spherical particles, the surface roughness S2/S3 increases with the number of wart-shaped projections present on the surfaces, whereas the surface roughness S2/S3 decreases with the number of wart-shaped projections present on the surfaces (i.e., smooth surfaces). In the latter case, the S2/S3 value is approximately 1.

No particular limitation is imposed on the shape of the aforementioned confeito-like shape silica nanoparticles (heteromorphous shaped nanoparticles), so long as the microparticles have a plurality of projections on the surfaces.

Examples of the aforementioned rod-like shape silica nanoparticles (heteromorphous shaped nanoparticles) include Snowtex (registered trademark) UP, OUP, IPA-ST-UP, and MEK-ST-UP, which are commercial products of Nissan Chemical Industries, Ltd.

Examples of the aforementioned string-of-pearls shape silica nanoparticles (heteromorphous shaped nanoparticles) include Snowtex (registered trademark) PS-S, PS-SO, PS-M, and PS-MO, which are commercial products of Nissan Chemical Industries, Ltd.

The heteromorphous shaped silica nanoparticles may be used in combination with spherical silica nanoparticles. The ratio between the two particle types (as solid content); i.e., heteromorphous shaped silica nanoparticles: spherical silica nanoparticles, is preferably 100:0 to 10:90.

In the hyperbranched polymer- or dendrimer-bound, heteromorphous shaped silica nanoparticles of the present invention, the hyperbranched polymer or the dendrimer is bound to the nanoparticles via a reactive functional group-containing compound which has a group that can form a covalent bond through reaction with silanol groups present on the surfaces of the heteromorphous shaped silica nanoparticles, and a reactive functional group serving as a bonding for binding the hyperbranched polymer or the dendrimer, in a single molecule of the compound.

An example of the reactive functional group-containing compound is a functional group-containing silane coupling agent. Examples of the reactive functional group of the silane coupling agent include an amino group, an isocyanato group, a mercapto group, a glycidyl group, a ureido group, and a halogen group.

The reactive functional group-containing compound is preferably a compound represented by the following formula (1):

[F4]

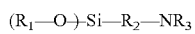

(wherein $R_1$ represents a methyl group or an ethyl group, $R_2$ represents a C1 to C5 alkylene group, an amido group, or an aminoalkylene group, and $R_3$ represents hydrogen or a group represented by the following formula (2):

[F5]

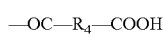

(wherein $R_4$ represents a C1 to C20 alkylene group or a C6 to C18 aromatic group)).

Specific examples of the compound represented by formula (1) include 3-aminopropyltriethoxysilane, 3-amopropyltrimethoxysilane, 3-ureidopropyltrimethoxysilane, 3-ureidopropyltriethoxysilane, 3-(2-aminoethylamino)propyltriethoxysilane, and 3-(2-aminoethylmino)propyltrimethoxysilane.

The reactive functional group-containing compound may be a silane coupling agent having a functional group other than an amino group. Example of the silane coupling agent include 3-isocyanatopropyltriethoxysilane, 3-mercaptopropylmethyldimethoxysilane, 3-mercaptopropyltrimethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-ureidopropyltriethoxysilane, and 3-chloropropyltrethoxysilane.

The reactive functional group-containing compound used in the present invention is not necessarily a trialkoxysilane compound represented by formula (1). For example, the reactive functional group-containing compound may be a dialkoxysilane compound or a monoalkoxysilane compound.

In the hyperbranched polymer- or dendrimer-bound, heteromorphous shaped silica nanoparticles of the present invention, the hyperbranched polymer or the dendrimer is bound to the nanoparticles via a reactive functional group-containing compound. The hyperbranched polymer or the dendrimer is a condensate of a monomer having a structure represented by the following formula (3):

[F6]

$$X_m—R_5—Y_n \quad (3)$$

(wherein $R_5$ represents a C1 to C20 alkylene group or a C6 to C18 aromatic group; each of X and Y represents a carboxyl group, an amino group, a methyl group, or a halogen atom; and each of m and n is an integer of 1 to 4, with a relationship $3 \leq m+n \leq 6$).

In the treatment of the heteromorphous shaped silica nanoparticles with the reactive functional group-containing compound, the heteromorphous shaped silica nanoparticles are dispersed in water or a C1 to C4 alcohol, and the reactive functional group-containing compound is added to the dispersion. The mixture is sufficiently stirred. Examples of the C1 to C4 alcohol include methanol, ethanol, 1-propanol, 2-propanol, 1-butanol, 2-butanol, 2-methyl-1-propanol, and 2-methyl-2-propanol. These alcohols may be used in combination as a mixed solvent.

As described above, chemical addition of reactive functional groups onto the surfaces of the heteromorphous shaped silica nanoparticles may be carried out via a single-step reaction or, if required, a two or more-step reaction. For example, carboxyl group-modified, heteromorphous shaped silica nanoparticles can be prepared by a two-step reaction as follows. Firstly, heteromorphous shaped silica nanoparticles are treated with aminoalkyltrialkoxysilane as described above, to thereby prepare amino group-modified, heteromorphous shaped silica nanoparticles. Subsequently, the amino group-modified, heteromorphous shaped silica nanoparticles are treated with a dicarboxylic acid compound represented by formula (4):

[F7]

$$HOOC—R_6—COOH \quad (4)$$

(wherein $R_6$ represents a C1 to C20 alkylene group or a C6 to C18 aromatic group) or an acid anhydride thereof, to thereby prepare reactive functional group-bound, heteromorphous shaped silica nanoparticles wherein the reactive functional group has a carboxyl group at its terminal.

Examples of the compound represented by formula (4) include malonic acid, adipic acid, and terephthalic acid. The dicarboxylic acid compound is not limited to those represented by formula (4).

The reactive functional group can be bound to the surfaces of heteromorphous shaped silica nanoparticles by a three or more-step reaction as follows: a monomer represented by the following formula (5) (i.e., a monomer having amino groups at both terminals)

[F8]

$$H_2N—R_7—NH_2 \quad (5)$$

(wherein $R_7$ represents a C1 to C20 alkylene group or $(—C_2H_4—O—)_p$ and/or $(—C_3H_6—O—)_q$, and each of p and q is an integer of 1 to 100) is bound to heteromorphous shaped silica nanoparticles treated with a compound represented by formula (1) and then with a compound represented by formula (3), to thereby prepare surface-modified, heteromorphous shaped silica nanoparticles, wherein the surface modification group has an amino group at its terminal. The aforementioned reaction is repeated.

Examples of the monomer represented by formula (5) include ethylenediamine, polyoxyethylenebisamine (molecular weight: 2,000), and O,O'-bis(2-aminopropyl)polypropylene glycol-block-polyethylene glycol (molecular weight: 500).

Chemical addition of the hyperbranched polymer or the dendrimer may be performed after substitution of the thus-prepared first solvent dispersion of the reactive functional group-modified, heteromorphous shaped silica nanoparticles to a second solvent.

The second solvent has hydrophobicity higher than that of the first solvent. The second solvent is preferably at least one species selected from among tetrahydrofuran (THF), N-methylpyrrolidone (NMP), dimethylacetamide (DMAc), dimethylformamide (DMF), and γ-butyrolactone (GBL). The second solvent may be a solvent mixture.

No particular limitation is imposed on the method of substituting the first solvent by the second solvent. In one mode of substitution, a first solvent dispersion of the reactive functional group-modified, heteromorphous shaped silica nanoparticles is dried, and then the dry product is re-dispersed in the second solvent. In an alternative mode, a first solvent dispersion of the reactive functional group-modified, heteromorphous shaped silica nanoparticles is not dried and is directly subjected to solvent substitution, to thereby provide a second solvent dispersion.

After solvent substitution, a dendrimer-forming monomer or a hyperbranched polymer-forming monomer is reacted with the second solvent dispersion of the reactive functional group-modified, heteromorphous shaped silica nanoparticles, to thereby prepare a second solvent dispersion of the heteromorphous shaped silica nanoparticles, wherein the hyperbranched polymer or the dendrimer is bound to the aforementioned reactive functional group-modified, heteromorphous shaped silica nanoparticles.

The dendrimer is synthesized by the divergent method or the convergent method. The divergent method involves protection-deprotection reaction of building blocks performed outward from a central core molecule. The convergent method involves inward synthesis of dendrons (i.e., dendrimer subunits) and subsequent coupling of the dendrons with a core molecule.

The hyperbranched polymer is basically synthesized by self-condensation of an AB2 monomer. The hyperbranched polymer can be much more easily synthesized than the dendrimer. The structure and molecular weight distribution profile of the hyperbranched polymer are not precisely restricted, as compared with the case of the dendrimer. The hyperbranched polymer is in the form of a mixture of compounds having different molecular weights and branching degrees, and can be handled in the same manner as a common polymer.

The hyperbranched polymer-forming monomer used in the present invention is preferably a compound represented by the following formula (6); i.e., a compound having one carboxyl group and two amino groups.

[F9]

(in formula (6), $R_a$ represents C1 to C20 alkylene group or a C6 to C18 aromatic group)

Examples of the hyperbranched polymer-forming monomer represented by formula (6) include 3,5-diaminobenzoic acid and 3,5-diamino-4-methylbenzoic acid.

The hyperbranched polymer-forming monomer used in the present invention may be a compound having 3 or more amino groups. Also, $R_6$ may be a group other than the C1 to C20 alkylene group or the aromatic group.

The hyperbranched polymer-forming monomer used in the present invention may be a compound represented by the following formula (7); i.e., a compound having one carboxyl group and two halogen atoms.

[F10]

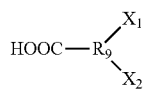

(7)

(in formula (7), $R_9$ is a C1 to C20 alkylene group or a C6 to C18 aromatic group, and each of $X_1$ and $X_2$ represents a halogen atom).

Examples of the compound represented by formula (7) include 3,5-dibromo-4-methylbenzoic acid, 3,5-dibromo-salicylic acid, and 3,5-dibromo-4-hydroxy-benzoic acid.

The hyperbranched polymer-forming monomer is not limited to the aforementioned compound having one carboxyl group and two or more amino groups or having one carboxyl group and two or more halogen atoms. Any monomer capable of forming a hyperbranched polymer may be appropriately selected depending on the type of the reactive functional group of the modified, heteromorphous shaped silica nanoparticles.

In the case where the surfaces of heteromorphous shaped, silica nanoparticles are modified with a carboxyl group by a two-step reaction, a hyperbranched polymer may be bound to the modified silica nanoparticles by use of a compound represented by the following formula (8); i.e., a compound having one amino group and two carboxyl groups.

[F11]

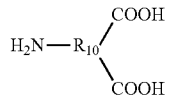

(8)

(in formula (8), $R_{10}$ represents a C1 to C20 alkylene group or a C6 to C18 aromatic group)

Examples of the compound represented by formula (8) include 2-aminoterephthalic acid, 4-aminoterephthalic acid, and DL-2-aminosuberic acid.

The hyperbranched polymer-forming monomer may be another monomer represented by the following formula (9); i.e., a monomer having one amino group and two or more halogen atoms.

[F12]

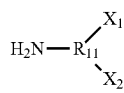

(9)

(in formula (9), $R_{11}$ represents a C1 to C20 alkylene group or a C6 to C18 aromatic group, and each of $X_1$ and $X_2$ represents a halogen atom)

Examples of the compound represented by formula (9) include 3,5-dibromo-4-methylaniline and 2,4-dibromo-6-nitroaniline.

In the case of using the heteromorphous shaped silica nanoparticles having surfaces modified with a carboxyl group by the aforementioned two-step reaction, the compounds of the formulas (8) and (9) may have two or more carboxyl groups or two or more halogen atoms, and the hyperbranched polymer-forming monomer may be another monomer having a functional group (other than an amino group) capable of reacting with a carboxyl group, as in the case of using the heteromorphous shaped silica nanoparticles having surfaces modified with an amino group by the aforementioned single-step reaction.

The single polymer chain of the hyperbranched polymer formed through the aforementioned reaction preferably has a weight average molecular weight of, for example, about 200 to about 2,000,000, and preferably has a branching degree of about 0.5 to about 1.

The reaction of chemically adding a hyperbranched polymer to the reactive functional group-modified, heteromorphous shaped silica nanoparticles can be performed as follows. The hyperbranched polymer-forming monomer is dissolved in the second solvent (i.e., one or more solvents selected from among tetrahydrofuran (THF), N-methylpyrrolidone (NMP), dimethylacetamide (DMAc), dimethylformamide (DMF), and γ-butyrolactone (GBL)); subsequently benzotriazol-1-yloxytris(dimethylamino)phosphonium hexafluorophosphate (BOP) (i.e., a carboxylic acid activating reagent) and triethylamine (i.e., a nucleophilic reagent) are bound to the solution, and the mixture is agitated; and the amino group-modified, heteromorphous shaped silica nanoparticles are bound to the mixture, and the resultant mixture is agitated. The aforementioned combination of BOP and triethylamine may be replaced with another combination. For example, the carboxylic acid activating reagent may be triphenylphosphine, and the nucleophilic reagent may be pyridine.

Dendrimer-bound, heteromorphous shaped silica nanoparticles will next be described. Now will be described addition of a dendrimer to amino group-modified, heteromorphous shaped silica nanoparticles.

For addition of a dendrimer to amino group-modified, heteromorphous shaped silica nanoparticles of the present invention, for example, a monomer represented by the following formula (10) (i.e., a monomer having three carboxyl groups) or a monomer having four or more carboxyl groups must be bound to the amino group-modified, heteromorphous shaped silica nanoparticles. Examples of the monomer used include trimesic acid and pyromellitic acid.

[F13]

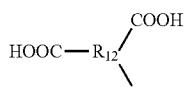

(10)

(in formula (10), $R_{12}$ represents a C1 to C20 alkylene group or a C6 to C18 aromatic group)

The aforementioned addition of a monomer having three carboxyl groups or a monomer having four or more carboxyl groups is followed by addition of a monomer represented by the following formula (5) (i.e., a monomer having two amino groups at both terminals). These addition reactions are repeated to thereby prepare dendrimer-modified, heteromorphous shaped silica nanoparticles.

In the case of using the heteromorphous shaped silica nanoparticles modified with a carboxyl group (i.e., a functional group) by the aforementioned two-step reaction, the carboxyl group-modified, heteromorphous shaped silica nanoparticles are treated with a monomer represented by the following formula (11) (i.e., a monomer having three amino groups) or a monomer having four or more amino groups.

[F14]

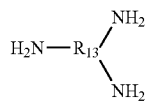

(11)

(in formula (11), $R_{13}$ represents a C1 to C20 alkylene group or a C6 to C18 aromatic group)

Examples of the monomer represented by formula (11) include 1,2,5-pentanetriamine and 1,2,4,5-benzenetetraamine.

Subsequently, a monomer represented by the following formula (12) (i.e., a monomer having two carboxyl groups at both terminals) is bound to the resultant silica nanoparticles. Examples of the monomer include succinic acid, levulinic acid, and O,O'-bis[2-(succinylamino)ethyl]polyethylene glycol (molecular weight: 2,000).

[F15]

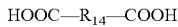

(12)

(in formula (12), $R_{14}$ represents a C1 to C20 alkylene group, or $(-C_2H_4-O-)_p$ and/or $(-C_3H_6-O-)_q$, and each of p and q is an integer of 1 to 100)

This addition is repeated to thereby prepare heteromorphous shaped silica nanoparticles having surfaces modified with a dendrimer. The dendrimer-forming monomer may have a group other than an amino group and a carboxyl group.

The thus-prepared second solvent dispersion of hyperbranched polymer- or dendrimer-bound, heteromorphous shaped silica nanoparticles is dried, and then the resultant silica nanoparticles are mixed with a matrix resin. Finally, the mixture is formed into a membrane. Before mixing of the silica nanoparticles with a matrix resin, at least a portion of the second solvent may be replaced with another second solvent or a solvent other than the second solvent.

The matrix resin may be appropriately selected from, for example, known resins that have been conventionally used for forming a gas separation membrane. Specific examples of the matrix resin include, but are not limited to, polyimide, polysulfone, polyether, polydimethylsiloxane, poly(substituted acetylene), poly-4-methylpentene, and natural rubber.

Polyimide has particularly excellent strength, durability, and thermal resistance and exhibits excellent gas permeation selectivity, as compared with other resins. Thus, polyimide is preferred as a matrix resin for forming the gas separation membrane of the present invention. No particular limitation is imposed on the amine structure of polyimide. Examples of the amine structure include a phenylenediamine in which one of amino functional groups at ortho position is substituted by an alkyl group, a phenylenediamine in which all the amino functional groups at ortho position are substituted by an alkyl group or an aromatic group, a diamine having a biphenyl structure in which three or more hydrogen atoms are substituted by substituents, a diamine having a naphthidine structure, and a specific brominated diamine.

Particularly preferred are 1,3,5-trimethylphenylenediamine and 2,5-di-t-butyl-1,4-phenylenediamine from the viewpoint of gas separation performance.

No particular limitation is imposed on the acid dianhydride to be used. Preferred is pyromellitic dianhydride, naphthalenecarboxylic dianhydride, or 4,4'-(hexafluoroisopylidene)diphthalic dianhydride (6FDA). Particularly preferred is 6FDA from the viewpoint of gas separation performance and gas permeability.

Such diamine and acid dianhydride may be used in combination with other acid dianhydride and diamine (5 mass % or less) for copolymerization. The copolymerization may be random copolymerization or block copolymerization.

No particular limitation is imposed on the polysulfone to be used, so long as the resin has at least one ($-SO_2-$) moiety in the molecular structure; for example, a repeating unit represented by the following formula (13).

[F16]

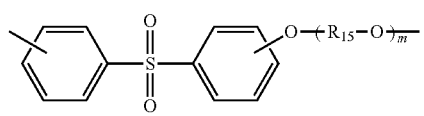

(13)

(in formula (13), $R_{15}$ represents a C2 to C10 saturated or unsaturated aliphatic group or a C6 to C18 aromatic group, and m is 0 or an integer of 1 to 20)

Specific examples of the polysulfone include resins having the following repeating units.

[F17]

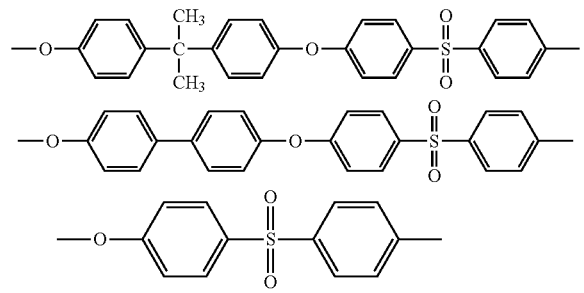

Examples of the polyether include aliphatic polyethers such as polyethylene oxide and polypropylene oxide; and aromatic polyethers such as polyether-ether ketone and polymer having an intrinsic porosity (PIM).

The gas separation membrane of the present invention is formed through adding the aforementioned hyperbranched polymer-added or dendrimer-added, heteromorphous shaped silica nanoparticles to a solution containing a matrix resin, and sufficiently mixing under stirring, to thereby form a uniform solution, which is applied onto a substrate. The solvent employed in this process is preferably the aforementioned second solvent.

In the gas separation membrane of the present invention, no particular limitation is imposed on the amount of the hyperbranched polymer- or dendrimer-bound, heteromorphous shaped silica nanoparticles, so long as the content allows formation of the relevant film. No particular limitation is imposed on the content, but the content is generally 1 to 70 mass %, with respect to the entire composition of the film, preferably 5 to 50 mass %, more preferably 10 to 50 mass %.

No particular limitation is imposed on the drying temperature after application of the silica nanoparticles-containing mixture to the substrate, so long as the solvent volatilizes at the temperature. The drying temperature is 10° C. to 300° C., preferably 30° C. to 200° C.

No particular limitation is imposed on the drying atmosphere of the coated film. However, in order to prevent oxidation of the matrix resin, drying is preferably performed under inert gas or in vacuum. From the viewpoint of volatilization of solvent, drying is preferably performed in vacuum.

The thickness of the gas separation membrane of the present invention may be appropriately adjusted so as to fit the purpose of use thereof. Generally, the thickness is about 10 to about 100 μm.

The thus-produced gas separation membrane exhibits excellent gas (e.g., $CO_2$, nitrogen, or oxygen) permeation performance.

Such advantageous performance might be attained by use of heteromorphous shaped silica nanoparticles. Conceivably, contact occurrence of hyperbranched polymer- or dendrimer-bound, heteromorphous shaped silica nanoparticles in the polymer matrix is enhanced. However, the present invention is not limited by this hypothesis.

EXAMPLES

The present invention will next be described in detail by way of examples, which should not be construed as limiting the invention thereto.

Example 1

(Production of 3,5-diaminobenzoic Acid (DABA)-Modified, String-of-Pearls Shape Silica Nanoparticles (P-NP), 10 mass %-Added Polyimide Composite Membrane)

To a 3-L eggplant-shaped flask, there was added an aqueous dispersion of string-of-pearls silica nanoparticles (Snowtex (registered trademark) PS-SO, product of Nissan Chemical Corporation, silica concentration: 15.5 mass %, particle size determined through the dynamic light scattering method (D1): 92 nm, particle size determined through the nitrogen adsorption method (D2): 15 nm, and D1/D2=6.1) (483.9 g). While isopropanol (IPA) (9.5 L) was added to the flask, water was removed from the contents at 8.7 kPa by means of an evaporator, whereby water was substituted by IPA. The operation was performed for 2 batches, to thereby yield 3,040 g of an IPA dispersion of P-NP. The thus-obtained IPA dispersion was found to have a silica concentration of 4.8 mass % and a water content of 0.7 mass %. Then, the IPA dispersion of P-NP was dispensed to two 3-L separable flasks in amounts of 1,556 g and 1,419 g, respectively. To the flasks, ultrapure water (2.7 g and 2.5 g) and 3-aminopropyltriethoxysilane (APTES) (product of Tokyo Chemical Industry Co., Ltd.) (22.2 g and 20.3 g) were added, and each of the resultant mixtures was agitated by means of a glass-paddle stirrer at room temperature for 48 hours. Each reaction mixture was subjected to centrifugation (1,500 G, 5 minutes), to thereby precipitate particles. After removal of the supernatant, ultrapure water was added, and the precipitate was dispersed again in water by means of an ultrasonic cleaner. This operation was repeated 11 times, to thereby prepare 5,223 g of an aqueous dispersion of APTES-modified P-NP. The APTES-modified P-NP aqueous dispersion (5,210 g) was charged into a 3-L eggplant-shaped flask, while water was removed at 4.0 kPa by means of an evaporator, to thereby concentrate the dispersion. Subsequently, water was further removed at 4.0 kPa, while N-methylpyrrolidone (NMP) (2.5 L) was added, to thereby yield 2,400 g of an NMP dispersion of APTES-modified P-NP. The thus-obtained NMP dispersion was found to have a solid content of 5.9 mass % and a water content of 0.7 mass %. In order to determine the APTES modification condition of the resultant APTES-modified P-NP, the aqueous dispersion of APTES-modified P-NP was dried at 110° C. for 15 hours, followed by thermogravimetric analysis by means of a TGA apparatus (DTG-60H, product of Shimadzu Corporation). The APTES-modified P-NP was found to contain APTES in an amount of 3.3 mass % and silica nanoparticles in an amount of 96.7 mass %. Subsequently, NMP (45.8 g), 1,3-diaminobenzoic acid (DABA) (product of Aldrich) (4.3 g), triethylamine (TEA) (product of Kanto Chemical Co., Inc.) (2.8 g), and benzotriazol-1-yloxytris(dimethylamino) phosphonium hexafluorophosphate (BOP) (product of Tokyo Chemical Industry Co., Ltd.) (12.3 g) were added to a 3-L separable flask, and the NMP dispersion (340 g) of APTES-modified P-NP was added thereto. The resultant mixture was agitated at room temperature for 5 minutes, and then reaction was allowed to proceed by means of an oil bath at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby prepare 110 g of an NMP dispersion of DABA-modified P-NP. The NMP dispersion of DABA-modified P-NP was found to have a solid content of 10.3 mass % and a water content of 0.6 mass %. The NMP dispersion (43.4 g) of DABA-modified P-NP was dried at 110° C. for 15 hours, to thereby prepare 5 g of DABA-modified N-PN as a dry powder. In order to determine the DABA modification condition of the DABA-modified P-NP, the silica nanoparticles were subjected to thermogravimetric analysis by means of a TGA apparatus (DTG-60H, product of Shimadzu Corporation). The DABA-modified P-NP was found to contain DABA in an amount of 5.5 mass %, APTES in an amount of 3.4 mass %, and silica nanoparticles in an amount of 91.1 mass %. The DABA-modified P-NP dry powder (0.0167 g) and tetrahydrofuran (THF, product of Kanto Chemical Co., Inc.) (3.2 mL) were added to a 10-mL vial, followed by dispersion treatment by means of an ultrasonic cleaner for 10 minutes. Polyimide represented by the following structure 1 (6FDA-3MPA, number average molecular weight: $2.5 \times 10^5$, weight average molecular weight/number average molecular weight=1.7) (0.15 g) was added to the dispersion, and the mixture was agitated by means of a magnetic stirrer at room temperature for 12 hours. The resultant polyimide solution containing the DABA-modified P-NP was poured into a glass petri dish (diameter: 6.1 cm), and the glass petri dish was placed in an oven at 40° C. The oven was evacuated to vacuum over four hours, to thereby form a composite membrane. The composite membrane was peeled from the petri dish with ultrapure water, and then thermally treated at 150° C. for 15 hours.

[F18]

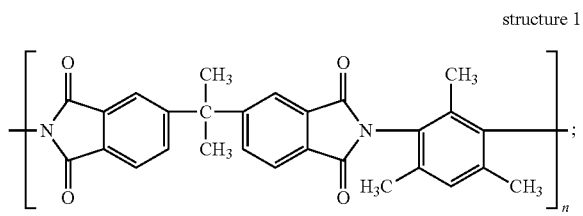

structure 1

The above-formed composite membrane was analyzed in terms of gas permeability. The analysis was performed by means of a gas permeability measuring apparatus (K-315N-01C, product of Rikaseiki. Co., Ltd.) at 35° C. and a pressure of 76 cmHg (feed gas: carbon dioxide, nitrogen, and oxygen). The results are shown in Table 1.

Example 2

(Production of 3,5-diaminobenzoic acid (DABA)-modified, rod-like shape silica nanoparticles (C-NP), 10 mass %-added polyimide composite membrane)

To a 3-L separable flask, there was added an IPA dispersion of rod-like shape silica nanoparticles (IPA-ST-UP, product of Nissan Chemical Corporation, silica concentration: 15.6 mass %, particle size determined through the dynamic light scattering method (D1): 49 nm, particle size determined through the nitrogen adsorption method (D2): 11 nm, D1/D2=4.5, and a uniform thickness of 10 to 15 nm as observed under a transmission electron microscope) (641 g). To the flask, IPA (982.8 g), ultrapure water (3.6 g), APTES (product of Tokyo Chemical Industry Co., Ltd.) (29.7 g) were added, and the resultant mixture was agitated by means of a glass-paddle stirrer at room temperature for 48 hours. The reaction mixture was subjected to centrifugation (1,500 G, 5 minutes), to thereby precipitate particles. After removal of the supernatant, ultrapure water was added, and the precipitate was dispersed again in water by means of an ultrasonic cleaner. This operation was repeated 12 times, to thereby prepare 1,900 g of an aqueous dispersion of APTES-modified C-NP. The APTES-modified C-NP aqueous dispersion (1,894 g) was charged into a 3-L eggplant-shaped flask, while water was removed at 4.0 kPa by means of an evaporator, to thereby concentrate the dispersion. Subsequently, water was further removed at 4.0 kPa, while NMP (1.5 L) was added, to thereby yield 1,435 g of an NMP dispersion of APTES-modified C-NP. The thus-obtained NMP dispersion was found to have a solid content of 5.2 mass % and a water content of 0.7 mass %. In order to determine the APTES modification condition of the resultant APTES-modified C-NP, the aqueous dispersion of APTES-modified C-NP was dried at 110° C. for 15 hours, followed by thermogravimetric analysis by means of a TGA apparatus (DTG-60H, product of Shimadzu Corporation). The APTES-modified C-NP was found to contain APTES in an amount of 3.6 mass % and silica nanoparticles in an amount of 96.4 mass %. Subsequently, NMP (38.2 g), DABA (3.5 g), TEA (2.4 g), and BOP (10.3 g) were added to a 3-L separable flask, and the NMP dispersion (766.3 g) of DABA-modified C-NP was added thereto. The resultant mixture was agitated at room temperature for 5 minutes, and then reaction was allowed to proceed by means of an oil bath at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby prepare 299.0 g of an NMP dispersion of DABA-modified C-NP. The NMP dispersion of DABA-modified C-NP was found to have a solid content of 7.5 mass % and a water content of 0.6 mass %. The NMP dispersion (53 g) of DABA-modified C-NP was dried at 110° C. for 15 hours, to thereby prepare 4 g of DABA-modified C-PN as a dry powder. In order to determine the DABA modification condition of the DABA-modified C-NP, the DABA-modified C-NP (NMP dry powder) was subjected to thermogravimetric analysis by means of a TGA apparatus. The DABA-modified C-NP was found to contain DABA in an amount of 7.3 mass %, APTES in an amount of 3.3 mass %, and silica nanoparticles in an amount of 89.4 mass %. The DABA-modified C-NP dry powder (0.0167 g) and THF (3.2 mL) were added to a 10-mL vial, followed by dispersion treatment by means of an ultrasonic cleaner for 10 minutes. 6FDA-3MPA (0.15 g) was added to the dispersion, and the mixture was agitated by means of a magnetic stirrer at room temperature for 12 hours. In the same manner as employed in Example 1, a composite membrane was formed from the thus-obtained polyimide solution containing DABA-modified C-NP. The above-formed composite membrane was analyzed in terms of gas permeability. The results are shown in Table 1.

Example 3

(Production of 3,5-diaminobenzoic Acid (DABA)-Double-Modified, String-of-Pearls Shape Silica Nanoparticles (P-NP-G2), 10 Mass %-Added Polyimide Composite Membrane)

NMP (377.6 g), DABA (35.0 g), TEA (23.3 g), and BOP (101.7 g) were added to a 3-L separable flask, and the NMP dispersion (1,700.7 g) of APTES-modified P-NP was added thereto. The resultant mixture was agitated at room temperature for 5 minutes, and then reaction was allowed to proceed by means of an oil bath at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby prepare 1,917 g of an NMP dispersion of DABA-modified P-NP. Subsequently, NMP (755.2 g), DABA (70.0 g), TEA (46.5 g), and BOP (203.4 g) were added to a 3-L separable flask, and the NMP dispersion (1,917 g) of DABA-modified P-NP was added thereto. The resultant mixture was agitated at room temperature for 5 minutes, and then reaction was allowed to proceed by means of an oil bath at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby prepare 956 g of an NMP dispersion of DABA-double-modified P-NP-G2. The NMP dispersion of DABA-double-modified P-NP-G2 was found to have a solid content of 7.0 mass % and a water content of 0.6 mass %. The NMP dispersion (53 g) of DABA-modified P-NP-G2 was dried at 110° C. for 15 hours, to thereby prepare 4 g of DABA-modified P-NP-G2 as a dry powder. In order to determine the DABA modification condition of the DABA-modified P-NP-G2, the DABA-double-modified P-NP-G2 dry powder was subjected to thermogravimetric analysis by means of a TGA apparatus. The DABA-modified P-NP-G2 was found to contain DABA in an amount of 16.0 mass %, APTES in an amount of 2.8 mass %, and silica nanoparticles in an amount of 81.2 mass %. The DABA-modified P-NP-G2 dry powder (0.0167 g) and THF (3.2 mL) were added to a 10-mL vial, followed by dispersion treatment by means of an ultrasonic cleaner for 10 minutes. 6FDA-3MPA (0.15 g) was added to the dispersion, and the mixture was agitated by means of a magnetic stirrer at room temperature for 12 hours. In the same manner as employed in Example 1, a composite membrane was formed from the thus-obtained polyimide solution containing DABA-modified P-NP-G2. The above-formed composite membrane was analyzed in terms of gas permeability. The results are shown in Table 1.

Comparative Example 1

(Particle-Non-Added Polyimide Membrane)

The procedure of Example 1 was repeated, except that DABA-modified P-NP was not added, to thereby form a polyimide membrane. The gas permeability of the membrane was measured.

Comparative Example 2

(Production of 3,5-diaminobenzoic Acid (DABA)-Modified, Spherical Silica Nanoparticles (S-NP), 10 Mass %-Added Polyimide Composite Membrane)

An isopropanol (IPA) dispersion of silica nanoparticles (IPA-ST, product of Nissan Chemical Corporation, silica concentration: 30 mass %, and particle size determined through the nitrogen adsorption method (D2): 12 nm) (33 mL) was placed in a 200-mL eggplant-shaped flask and diluted with IPA (166 mL). To the flask, ultrapure water (0.36 g) and APTES (product of Tokyo Chemical Industry Co., Ltd.) (3.14 mL) were added, and the resultant mixture was agitated by means of a magnetic stirrer at room temperature for 48 hours. The reaction mixture was subjected to centrifugation (1,500 G, 5 minutes), to thereby precipitate particles. After removal of the supernatant, ultrapure water was added, and the precipitate was dispersed again in water by means of an ultrasonic cleaner. This operation was repeated 12 times, to thereby prepare 400 mL of an aqueous dispersion of APTES-modified silica nanoparticles. In order to determine the APTES modification condition of the resultant APTES-modified silica nanoparticles, the aqueous dispersion of APTES-modified silica nanoparticles was dried at 110° C. for 15 hours, followed by thermogravimetric analysis by means of a TGA apparatus (DTG-60H, product of Shimadzu Corporation). The APTES-modified silica nanoparticles were found to contain APTES in an amount of 4.3 mass % and silica nanoparticles in an amount of 95.7 mass %. The aqueous dispersion (200 mL) of APTES-modified silica nanoparticles was added to a reactor (capacity: 200 mL), and 1-methyl-2-pyrrolidone (NMP) (50 mL) was added thereto. Water was removed from the reactor by means of an evaporator, to thereby yield 40 mL of an NMP dispersion of APTES-modified silica nanoparticles. Subsequently, NMP (6 mL), DABA (1.71 g), TEA (15.7 mL), and BOP (4.97 g) were placed in a reactor (capacity: 80 mL), and the NMP dispersion (40 mL) of APTES-modified silica nanoparticles was added thereto. The resultant mixture was agitated at room temperature for 5 minutes, and reaction was allowed to proceed by means of a microwave reactor (Discover SP, Chem, Japan) at 80° C. for 1 hour. The resultant reaction mixture was subjected to centrifugation (1,500 G, 5 hour2), to thereby precipitate particles. After removal of the supernatant, NMP was added, and the precipitate was dispersed again by means of an ultrasonic cleaner. This operation was repeated three times, to thereby yield a DABA-modified S-NP dispersion (100 mL). The dispersion was dried at 110° C. for 15 hours, to thereby yield 0.65 g of DABA-modified S-NP. In order to determine the DABA modification condition of the DABA-modified S-NP, the DABA-modified S-NP was subjected to thermogravimetric analysis by means of a TGA apparatus (DTG-60H, product of Shimadzu Corporation). The DABA-modified S-NP was found to contain DABA in an amount of 12.8 mass %, APTES in an amount of 3.75 mass %, and silica nanoparticles in an amount of 83.4 mass %. The DABA-modified S-NP dry powder (0.0167 g) and THF (3.2 mL) were added to a 10-mL vial, followed by dispersion treatment by means of an ultrasonic cleaner for 10 minutes. 6FDA-3MPA (0.15 g) was added to the dispersion, and the mixture was agitated by means of a magnetic stirrer at room temperature for 12 hours. In the same manner as employed in Example 1, a composite membrane was formed from the thus-obtained polyimide solution containing DABA-modified S-NP. The above-formed composite membrane was analyzed in terms of gas permeability. The results are shown in Table 1.

Example 4

(Production of 3,5-dimethylbenzoic Acid (DMBA)-Modified, String-of-Pearls Shape Silica Nanoparticles (P-NP), 10 Mass %-Added Polyimide Composite Membrane)

To a 200-mL eggplant-shaped flask, an IPA dispersion (silica concentration: 5.0 mass %) of P-NP produced through the same method as employed in Example 1 was added in an amount of 100 g, and ultrapure water (0.19 g) and APTES (1.6 mL) were added to the flask. The mixture was agitated at room temperature for 48 hours by means of a magnetic stirrer. The reaction mixture was subjected to centrifugation (1,500 G, 10 minutes), to thereby precipitate particles. After removal of the supernatant, ultrapure water was added, and the precipitate was dispersed again in water by means of an ultrasonic cleaner. This operation was repeated 12 times, to thereby prepare 200 mL of an aqueous dispersion of APTES-modified P-NP. In order to determine the APTES modification condition of the resultant APTES-modified P-NP, the aqueous dispersion of APTES-modified P-NP was dried at 110° C. for 15 hours, followed by thermogravimetric analysis by means of a TGA apparatus (DTG-60H, product of Shimadzu Corporation). The APTES-modified P-NP was found to contain APTES in an amount of 2.57 mass and silica nanoparticles in an amount of 97.4 mass %. The aqueous dispersion (200 mL) of APTES-modified P-NP was added to a 200-mL eggplant-shaped flask, and NMP (35 mL) was added thereto. Water was removed from the flask by means of an evaporator, to thereby yield 30 mL of an NMP dispersion of APTES-modified P-NP. Subsequently, NMP (5 mL), 1,3-dimethylbenzoic acid (DMBA, product of Aldrich) (1.10 g), TEA (1.02 mL), and BOP (3.23 g) were placed in a reactor (capacity: 80 mL), and the NMP dispersion (30 mL) of APTES-modified P-NP was added thereto. The resultant mixture was agitated at room temperature for 5 minutes, and reaction was allowed to proceed by means of a microwave reactor at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby yield a DABA-modified P-NP NMP dispersion (100 mL). The dispersion was dried at 110° C. for 15 hours, to thereby yield 1.82 g of DMBA-modified P-NP. In order to determine the DMBA modification condition of the DMBA-modified P-NP, the DMBA-modified P-NP was subjected to thermogravimetric analysis by means of a TGA apparatus (DTG-60H, product of Shimadzu Corporation). The DMBA-modified P-NP was found to contain DMBA in an amount of 2.67 mass %, APTES in an amount of 2.54 mass %, and silica nanoparticles in an amount of 94.7 mass %. The DMBA-modified P-NP (0.0167 g) and THF (3.2 mL) were added to a 10-mL vial, followed by dispersion treatment by means of an ultrasonic cleaner for 10 minutes. 6FDA-3MPA (0.15 g) was added to the dispersion, and the mixture was agitated by means of a magnetic stirrer at room temperature for 12 hours. In the same manner as employed in Example 1, a composite membrane was formed from the thus-obtained polyimide solution containing DMBA-modified P-NP. The above-formed composite membrane was analyzed in terms of gas permeability. The results are shown in Table 1.

Comparative Example 3

(Production of 3,5-dimethylbenzoic Acid (DMBA)-Modified, Spherical Silica Nanoparticles (S-NP), 10 Mass %-Added Polyimide Composite Membrane)

An isopropanol (IPA) dispersion of silica spherical particles (IPA-ST, product of Nissan Chemical Corporation, silica concentration: 30 mass %, and particle size determined through the nitrogen adsorption method (D2): 12 nm) (33 mL) was placed in a 200-mL eggplant-shaped flask and diluted with IPA (166 mL). To the flask, ultrapure water (0.36 g) and APTES (3.14 mL) were added, and the resultant mixture was agitated by means of a magnetic stirrer at room temperature for 48 hours. The reaction mixture was subjected to centrifugation (1,500 G, 5 minutes), to thereby precipitate particles. After removal of the supernatant, ultrapure water was added, and the precipitate was dispersed again in water by means of an ultrasonic cleaner. This operation was repeated 12 times, to thereby prepare 400 mL of an aqueous dispersion of APTES-modified S-NP. In order to determine the APTES modification condition of the resultant APTES-modified S-NP, the aqueous dispersion of APTES-modified S-NP was dried at 110° C. for 15 hours, followed by thermogravimetric analysis by means of a TGA apparatus (DTG-60H, product of Shimadzu Corporation). The APTES-modified S-NP was found to contain APTES in an amount of 4.4 mass % and silica nanoparticles in an amount of 95.6 mass %, through rough calculation. The aqueous dispersion (200 mL) of APTES-modified S-NP was added to a reactor (capacity: 200 mL), and NMP (50 mL) was added thereto. Water was removed from the reactor by means of an evaporator, to thereby yield 40 mL of an NMP dispersion of APTES-modified S-NP. Subsequently, NMP (6 mL), DMSA (1.76 g), TEA (16.2 mL), and BOP (5.13 g) were placed in a reactor (capacity: 80 mL), and the NMP dispersion (40 mL) of APTES-modified S-NP was added thereto. The resultant mixture was agitated at room temperature for 5 minutes, and reaction was allowed to proceed by means of a microwave reactor at 80° C. for 1 hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby yield 100 mL of an NMP dispersion of DMBA-modified S-NP. The dispersion was dried at 110° C. for 15 hours, to thereby yield 0.83 g of DMBA-modified S-NP. In order to determine the DMBA modification condition of the DMBA-modified S-NP, the DMBA-modified S-NP was subjected to thermogravimetric analysis by means of a TGA apparatus (DTG-60H, product of Shimadzu Corporation). The DMBA-modified S-NP was found to contain DMBA in an amount of 5.8 mass %, APTES in an amount of 4.1 mass %, and silica nanoparticles in an amount of 90.1 mass %. 6FDA-3MPA (0.15 g) was dissolved in THF (3.21 mL), and DMBA-modified S-NP (0.0167 g) was added to the polymer solution. In the same manner as employed in Example 1, a composite membrane was formed, and the gas permeability of the composite membrane was measured. The results are shown in Table 1.

Example 5

(3,5-Diaminobenzoic Acid (DABA)-Modified, String-of-Pearls Shape Silica Nanoparticles (P-NP), 30 Mass %-Added Polyimide Composite Membrane)

The procedure of Example 1 was repeated, the amount of the DABA-modified P-NP dry powder produced in Example 1 with respect to the total solid content of the membrane was changed to 30 mass %, to thereby form a composite membrane. The gas permeability of the composite membrane was measured. Table 1 shows the results.

Example 6

(3,5-Diaminobenzoic acid (DABA)-modified, rod-like shape silica nanoparticles (C-NP), 30 mass %-added polyimide composite membrane)

The procedure of Example 2 was repeated, the amount of the DABA-modified C-NP dry powder produced in Example 2 with respect to the total solid content of the membrane was changed to 30 mass %, to thereby form a composite membrane. The gas permeability of the composite membrane was measured.

The procedure of Example 2 was repeated, the amount of the DABA-modified C-NP dry powder produced in Example 2 with respect to the total solid content of the membrane was changed to 30 mass %, to thereby form a composite membrane. The gas permeability of the composite membrane was measured.

Example 7

(3,5-Diaminobenzoic Acid (DABA)-Double-Modified, String-of-Pearls Shape Silica Nanoparticles (P-NP-2G), 30 Mass %-Added Polyimide Composite Membrane)

The procedure of Example 3 was repeated, the amount of the DABA-modified P-NP-G2 dry powder produced in Example 3 with respect to the total solid content of the membrane was changed to 30 mass %, to thereby form a composite membrane. The gas permeability of the composite membrane was measured. Table 1 shows the results.

Example 8

(3,5-Diaminobenzoic Acid (DABA)-Modified, String-of-Pearls Shape Silica Nanoparticles (P-NP) and 3,5-diaminobenzoic Acid (DABA)-Modified, Spherical Silica Nanoparticles (S-NP), (15+15) Mass %-Added Polyimide Composite Membrane)

6FDA-3MPA dry powder (0.15 g) was dissolved in THF (3.21 mL), to thereby prepare a polymer solution. DABA-modified P-NP dry powder (0.0322 g) produced in Example 1 and DABA-modified S-NP dry powder (0.0322 g) produced in Comparative Example 2 were added to the polymer solution. In the same manner as employed in Example 1, a composite membrane was formed, and the gas permeability of the composite membrane was measured. Table 1 shows the results.

Example 9

(3,5-Diaminobenzoic Acid (DABA)-Double-Modified, String-of-Pearls Shape Silica Nanoparticles (P-NP-G2) and 3,5-diaminobenzoic Acid (DABA)-Modified, Spherical Silica Nanoparticles (S-NP), (24+6) mass %-Added Polyimide Composite Membrane)

6FDA-3MPA dry powder (0.15 g) was dissolved in THF (3.21 mL), to thereby prepare a polymer solution. DABA-modified P-NP-G2 dry powder (0.0514 g) produced in Example 6 and DABA-modified S-NP dry powder (0.0129 g) produced in Comparative Example 2 were added to the polymer solution. In the same manner as employed in Example 1, a composite membrane was formed, and the gas permeability of the composite membrane was measured. Table 1 shows the results.

Comparative Example 4

(3,5-Diaminobenzoic Acid (DABA)-Modified, Spherical Silica Nanoparticles (S-NP), 30 Mass %-Added Polyimide Composite Membrane)

The procedure of Comparative Example 2 was repeated, the amount of the DABA-modified S-NP dry powder produced in Comparative Example 2 with respect to the total solid content of the membrane was changed to 30 mass-%, to thereby form a composite membrane. The gas permeability of the composite membrane was measured. Table 1 shows the results.

Example 10

(Production of 3,5-diaminobenzoic Acid (DABA)-Modified, String-of-Pearls Shape Silica Nanoparticles (P-NP), 10 Mass %-Added PIM-1 Composite Membrane)

The DABA-modified P-NP dry powder produced in Example 1 (0.0167 g) and THF (6.7 mL) were added to a 10-mL vial, followed by dispersion treatment by means of an ultrasonic cleaner for 10 minutes. PIM-1 represented by the following structure 2 (weight average molecular weight: $3.1 \times 10^5$, weight average molecular weight/number average molecular weight=5.4) (0.15 g) was added to the dispersion, and the mixture was agitated by means of a magnetic stirrer at room temperature for 12 hours. The resultant PIM-1 solution containing the DABA-modified silica nanoparticles was poured into a glass petri dish (diameter: 6.1 cm), and the glass petri dish was placed in an oven at 30° C. The oven was evacuated to vacuum over 6 hours, to thereby form a composite membrane. The composite membrane was peeled from the petri dish with ultrapure water, and then thermally treated at 70° C. for 18 hours.

[F19]

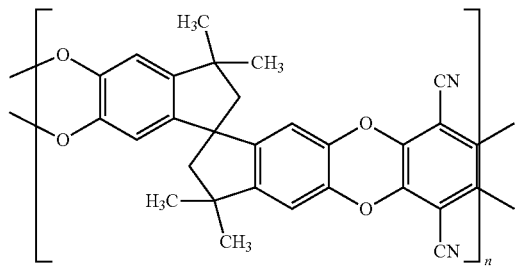

structure 2

The above-formed composite membrane was analyzed in terms of gas permeability. In the same manner as employed in Example 1, the analysis was performed by means of a gas permeability measuring apparatus (K-315N-01C, product of Rikaseiki Co., Ltd.). Table 1 shows the results.

Comparative Example 5

(Particle-Non-Added PIM-1 Membrane)

The procedure of Example 10 was repeated, except that no silica nanoparticles were added, to thereby form a PIM-1 membrane. The gas permeability of the membrane was measured. Table 1 shows the results.

Comparative Example 6

(Production of 3,5-diaminobenzoic Acid (DABA)-Modified, Spherical Silica Nanoparticles (S-NP), 10 Mass %-Added PIM-1 Composite Membrane)

The procedure of Example 10 was repeated, except that DABA-modified S-NP dry powder produced in Comparative Example 2 was used, to thereby form a composite membrane. The gas permeability of the membrane was measured. Table 1 shows the results.

Comparative Example 7

(Production of 3,5-dimethylbenzoic Acid (DMBA)-Modified, Spherical Silica Nanoparticles (S-NP), 10 Mass %-Added PIM-1 Composite Membrane)

The procedure of Example 10 was repeated, except that DMSA-modified S-NP dry powder produced in Comparative Example 3 was used, to thereby form a composite membrane. The gas permeability of the membrane was measured. Table 1 shows the results.

TABLE 1

| Exs. | Shape of silica particles | Silica (mass %) | Matrix resin | $P_{CO2}$ | $P_{N2}$ | $P_{O2}$ |
|---|---|---|---|---|---|---|
| Ex. 1 | string-of-pearls | 10 | 6FDA-3MPA | 664 | 34.1 | 119 |
| Ex. 2 | elongated | 10 | 6FDA-3MPA | 736 | 38.2 | 133 |
| Ex. 3 | string-of-pearls | 10 | 6FDA-3MPA | 759 | 40.6 | 138 |
| Comp. 2 | spherical | 10 | 6FDA-3MPA | 646 | 35.9 | 123 |
| Comp. 1 | — | 0 | 6FDA-3MPA | 598 | 29.4 | 105 |
| Ex. 4 | string-of-pearls | 10 | 6FDA-3MPA | 785 | 40.8 | 137 |
| Comp. 3 | spherical | 10 | 6FDA-3MPA | 751 | 40.2 | 132 |
| Ex. 5 | string-of-pearls | 30 | 6FDA-3MPA | 933 | 57.8 | 181 |
| Ex. 6 | elongated | 30 | 6FDA-3MPA | 1080 | 70.1 | 211 |
| Ex. 7 | string-of-pearls | 30 | 6FDA-3MPA | 1720 | 107 | 335 |
| Ex. 8 | string-of-pearls/spherical | 30 | 6FDA-3MPA | 1060 | 65.8 | 320 |

TABLE 1-continued

| Exs. | Shape of silica particles | Silica (mass %) | Matrix resin | $P_{CO2}$ | $P_{N2}$ | $P_{O2}$ |
|---|---|---|---|---|---|---|
| Ex. 9 | string-of-pearls/spherical | 30 | 6FDA-3MPA | 1170 | 58.5 | 176 |
| Comp. 4 | spherical | 30 | 6FDA-3MPA | 852 | 47.6 | 163 |
| Ex. 10 | string-of-pearls | 10 | PIM-1 | 4620 | 255 | 846 |
| Comp. 6 | spherical | 10 | PIM-1 | 2960 | 141 | 544 |
| Comp. 7 | spherical | 10 | PIM-1 | 2590 | 124 | 499 |
| Comp. 5 | — | 0 | PIM-1 | 2340 | 114 | 424 |

P: gas permeation coefficient
Barrier = $1 \times 10^{-10}$ (cm$^3$ (STP) cm/cm$^2$ · sec · cmHg)

As is clear from Table 1, when the silica content was same, all gas separation membranes containing heteromorphous shaped silica nanoparticles (Examples) exhibited higher gas permeation coefficient to $CO_2$, as compared with gas separation membranes of Comparative Examples containing spherical silica nanoparticles. Thus, heteromorphous shaped silica nanoparticles were found to be particularly effective for enhancing gas permeation to $CO_2$.

The invention claimed is:

1. A gas separation membrane, comprising a matrix resin and hyperbranched polymer- or dendrimer-bound, heteromorphous shaped silica nanoparticles, which are formed of heteromorphous shaped silica nanoparticles having surfaces onto which a hyperbranched polymer or a dendrimer is chemically added, wherein the heteromorphous shaped silica nanoparticles are at least one silica nanoparticle species selected from the group consisting of:
rod-like shape silica nanoparticles, which have a ratio D1/D2 is ≥4, wherein D1 is a particle size determined through a dynamic light scattering method, and D2 is a particle size determined through a nitrogen gas adsorption method; which has a D1 of 40 to 500 nm; and which have a uniform diameter of 5 to 40 nm as observed under a transmission electron microscope;
string-of-pearls shape silica nanoparticles which are formed of colloidal silica spherical particles having a particle size D2 determined through the nitrogen gas adsorption method of 10 to 80 nm, and silica which binds together the colloidal silica spherical particles; which has a ratio D1/D2 is ≥3, wherein D1 is a particle size determined through the dynamic light scattering method, and D2 is a particle size of the colloidal silica spherical particles determined through the nitrogen gas adsorption method; which has a D1 of 40 to 500 nm; and which are formed of the colloidal silica spherical particles connected together; and
confeito-like shape silica nanoparticles which have a surface roughness S2/S3 of 1.2 to 10, wherein S2 is a specific surface area determined through the nitrogen gas adsorption method, and S3 is a specific surface area obtained by reducing a mean particle size D3 determined through image analysis; which have a D3 of 10 to 60 nm; and which have a plurality of wart-shaped projections on the surfaces thereof.

2. A gas separation membrane according to claim 1, wherein the hyperbranched polymer- or dendrimer-bound, heteromorphous shaped silica nanoparticles are formed of heteromorphous shaped silica nanoparticles bound to a hyperbranched polymer or a dendrimer by the mediation of a reactive functional group-containing compound.

3. A gas separation membrane according to claim 2, wherein the reactive functional group-containing compound is a functional group-containing silane coupling agent.

4. A gas separation membrane according to claim 2, wherein the reactive functional group-containing compound is a compound represented by the following formula (1):

[F1]

$$(R_1-O)_3Si-R_2-NR_3 \qquad (1)$$

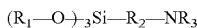

(wherein $R_1$ represents a methyl group or an ethyl group; $R_2$ represents a C1 to C5 alkylene group, an amido group, or an aminoalkylene group; and $R_3$ represents hydrogen or a group represented by the following formula (2):

[F2]

$$-OC-R_4-COOH \qquad (2)$$

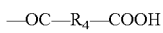

(wherein $R_4$ represents a C1 to C20 alkylene group or a C6 to C18 aromatic group).

5. A gas separation membrane according to claim 1, wherein the hyperbranched polymer or dendrimer is a condensate of a monomer having a structure represented by the following formula (3):

[F3]

$$X_m-R_5-Y_n \qquad (3)$$

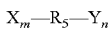

(wherein $R_5$ represents a C1 to C20 alkylene group or a C6 to C18 aromatic group; each of X and Y represents a carboxyl group, an amino group, a methyl group, or a halogen atom; and m and n are integers of 1 to 4, with 3≤m+n≤6).

6. A gas separation membrane according to claim 1, wherein the matrix resin is at least one species selected from the group consisting of polyimide, polysulfone, polyether, polydimethylsiloxane, poly(substituted acetlyene), poly-4-methylpentene, and natural rubber.

7. A gas separation membrane according to claim 5, wherein the matrix resin is at least one species selected from the group consisting of polyimide, polysulfone, polyether, polydimethylsiloxane, poly(substituted acetlyene), poly-4-methylpentene, and natural rubber.

8. A gas separation membrane according to claim 1, wherein the hyperbranched polymer- or dendrimer-bound, heteromorphous shaped silica nanoparticle content is 1 to 70 mass %.

9. A gas separation membrane according to claim 5, wherein the hyperbranched polymer- or dendrimer-bound, heteromorphous shaped silica nanoparticle content is 1 to 70 mass %.

10. A gas separation membrane according to claim 6, wherein the hyperbranched polymer- or dendrimer-bound, heteromorphous shaped silica nanoparticle content is 1 to 70 mass %.

11. A gas separation membrane according to claim 7, wherein the hyperbranched polymer- or dendrimer-bound, heteromorphous shaped silica nanoparticle content is 1 to 70 mass %.

12. A hyperbranched polymer- or dendrimer-bound, heteromorphous shaped silica nanoparticles, being formed of heteromorphous shaped silica nanoparticles having surfaces onto which a hyperbranched polymer or a dendrimer is chemically added, wherein the heteromorphous shaped silica nanoparticles are at least one silica nanoparticle species selected from the group consisting of:
rod-like shape silica nanoparticles, which have a ratio D1/D2 is ≥4, wherein D1 is a particle size determined through a dynamic light scattering method, and D2 is a particle size determined through a nitrogen gas adsorption method; which has a D1 of 40 to 500 nm; and which have a uniform diameter of 5 to 40 nm as observed under a transmission electron microscope;

string-of-pearls shape silica nanoparticles which are formed of colloidal silica spherical particles having a particle size D2 determined through the nitrogen gas adsorption method of 10 to 80 nm, and silica which binds together the colloidal silica spherical particles; which has a ratio D1/D2 is ≥3, wherein D1 is a particle size determined through the dynamic light scattering method, and D2 is a particle size of the colloidal silica spherical particles determined through the nitrogen gas adsorption method; which has a D1 of 40 to 500 nm; and which are formed of the colloidal silica spherical particles connected together; and confeito-like shape silica nanoparticles which have a surface roughness S2/S3 of 1.2 to 10, wherein S2 is a specific surface area determined through the nitrogen gas adsorption method, and S3 is a specific surface area obtained by reducing a mean particle size D3 determined through image analysis; which have a D3 of 10 to 60 nm; and which have a plurality of wart-shaped projections on the surfaces thereof.

13. A composite material, comprising the hyperbranched polymer- or dendrimer-bound as recited in claim 12, heteromorphous shaped silica nanoparticles, and a matrix resin.

14. A composite material according to claim 13, wherein the matrix resin is at least one species selected from the group consisting of polyimide, polysulfone, polyether, polydimethylsiloxane, poly(substituted acetlyene), poly-4-methylpentene, and natural rubber.

15. A composite material according to claim 13, wherein the matrix resin is a PIM-1 represented by the following structure 2:

structure 2

* * * * *